(12) United States Patent
Kojima et al.

(10) Patent No.: US 11,318,839 B2
(45) Date of Patent: May 3, 2022

(54) VEHICLE CONTROL DEVICE

(71) Applicant: HONDA MOTOR CO., LTD., Tokyo (JP)

(72) Inventors: Toshihiro Kojima, Wako (JP); Katsuyasu Yamane, Wako (JP); Tomonori Watanabe, Wako (JP); Gaku Shimamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 16/239,022

(22) Filed: Jan. 3, 2019

(65) Prior Publication Data

US 2019/0210459 A1 Jul. 11, 2019

(30) Foreign Application Priority Data

Jan. 9, 2018 (JP) .............................. JP2018-001247

(51) Int. Cl.
| | |
|---|---|
| *B60K 28/04* | (2006.01) |
| *B60W 20/00* | (2016.01) |
| *B60K 28/12* | (2006.01) |
| *B60K 6/20* | (2007.10) |

(52) U.S. Cl.
CPC .............. *B60K 28/04* (2013.01); *B60K 28/12* (2013.01); *B60W 20/00* (2013.01); *B60K 6/20* (2013.01); *B60W 2540/00* (2013.01); *B60Y 2200/92* (2013.01)

(58) Field of Classification Search
CPC ...... B60K 28/04; B60K 28/12; B60K 28/063; B60W 2540/00
See application file for complete search history.

(56) References Cited

U.S. PATENT DOCUMENTS

| | | | |
|---|---|---|---|
| 2010/0265055 A1* | 10/2010 | Denale | .................... B60N 2/28 340/457.1 |
| 2011/0320083 A1 | 12/2011 | Nishimura | |
| 2018/0265020 A1* | 9/2018 | Aoyagi | .................. B60N 2/002 |

FOREIGN PATENT DOCUMENTS

| | | |
|---|---|---|
| JP | 2006-256481 A | 9/2006 |
| JP | 2006-347299 A | 12/2006 |
| JP | 2010-209803 A | 9/2010 |
| JP | 2015-120403 A | 7/2015 |

OTHER PUBLICATIONS

Office Action dated Jun. 25, 2019 issued over the corresponding Japanese Patent Application No. 2018-001247 with the English translation thereof.

\* cited by examiner

*Primary Examiner* — Navid Z. Mehdizadeh
(74) *Attorney, Agent, or Firm* — Carrier Blackman & Associates, P.C.; Joseph P. Carrier; Jeffrey T. Gedeon (57) ABSTRACT

A vehicle control device includes a vehicle controller that, if a predetermined state transition condition is satisfied, makes a state transition of a vehicle from a drive possible state to a drive impossible state. The vehicle control device includes a vehicle occupant detection unit that detects a vehicle occupant in the vehicle. The vehicle controller makes the state transition to the drive impossible state that is different depending on a detection result from the vehicle occupant detection unit.

8 Claims, 12 Drawing Sheets

VEHICLE CONTROL DEVICE

CROSS-REFERENCE TO RELATED APPLICATION

This application is based upon and claims the benefit of priority from Japanese Patent Application No. 2018-001247 filed on Jan. 9, 2018, the contents of which are incorporated herein by reference.

BACKGROUND OF THE INVENTION

Field of the Invention

The present invention relates to a vehicle control device that controls a power source of a vehicle, for example.

Description of the Related Art

An object of Japanese Laid-Open Patent Publication No. 2006-256481 is to reduce the consumption of power and fuel in a case where a hybrid vehicle is left in an active state.

In order to achieve the above object, Japanese Laid-Open Patent Publication No. 2006-256481 discloses a device including a hybrid system including an engine, a traction motor, a drive battery, and a motor driving circuit that receives power supplied from the drive battery and controls current supply to the traction motor. In this hybrid system, the engine is driven intermittently while the vehicle is in the active state.

This device employs an electronic key system that permits the activation of the vehicle on the basis of wireless communications between an electronic key and the vehicle. When it is detected that the electronic key does not exist in a vehicle cabin, that parking is intended, and that a driver is absent, while the vehicle is in the active state, an automatic stop control ECU deactivates the engine and stops the power supply from the drive battery to the motor driving circuit.

SUMMARY OF THE INVENTION

The device according to Japanese Laid-Open Patent Publication No. 2006-256481 also deactivates the power supply to the drive source (the engine and the traction motor) and accessories when it is detected that the parking is intended, the electronic key does not exist inside the vehicle, and the driver is absent. That is to say, the device according to Japanese Laid-Open Patent Publication No. 2006-256481 is to achieve a drive impossible state for the driver only, and the drive impossible state for all vehicle occupants is not taken into consideration. If there is a vehicle occupant, who is not a driver, staying in the vehicle, deactivating the power source for the accessories will fail to make the vehicle occupant feel comfortable.

The present invention has been made in view of such a problem, and an object is to provide a vehicle control device that can perform a state transition control suitably in accordance with a situation in a vehicle without an immediate drive intention, and can make a state transition to a drive impossible state that is different depending on a result of detecting not only the driver but also the other vehicle occupant.

A vehicle control device according to an aspect of the present invention includes a state transition unit configured to, if a predetermined state transition condition is satisfied, make a state transition of a vehicle from a drive possible state to a drive impossible state, and a vehicle occupant detection unit configured to detect a vehicle occupant in the vehicle, wherein the state transition unit is configured to make the state transition to the drive impossible state that is different depending on a detection result from the vehicle occupant detection unit.

The vehicle control device according to the above aspect of the present invention can perform state transition control suitably in accordance with a situation in the vehicle without an instantaneous drive intention, and can make the state transition to the drive impossible state that is different depending on a result of detecting not only the driver but also the other vehicle occupant.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of a vehicle control device according to the present invention is hereinafter described with reference to FIG. 1 to FIG. 12.

Figure 1:
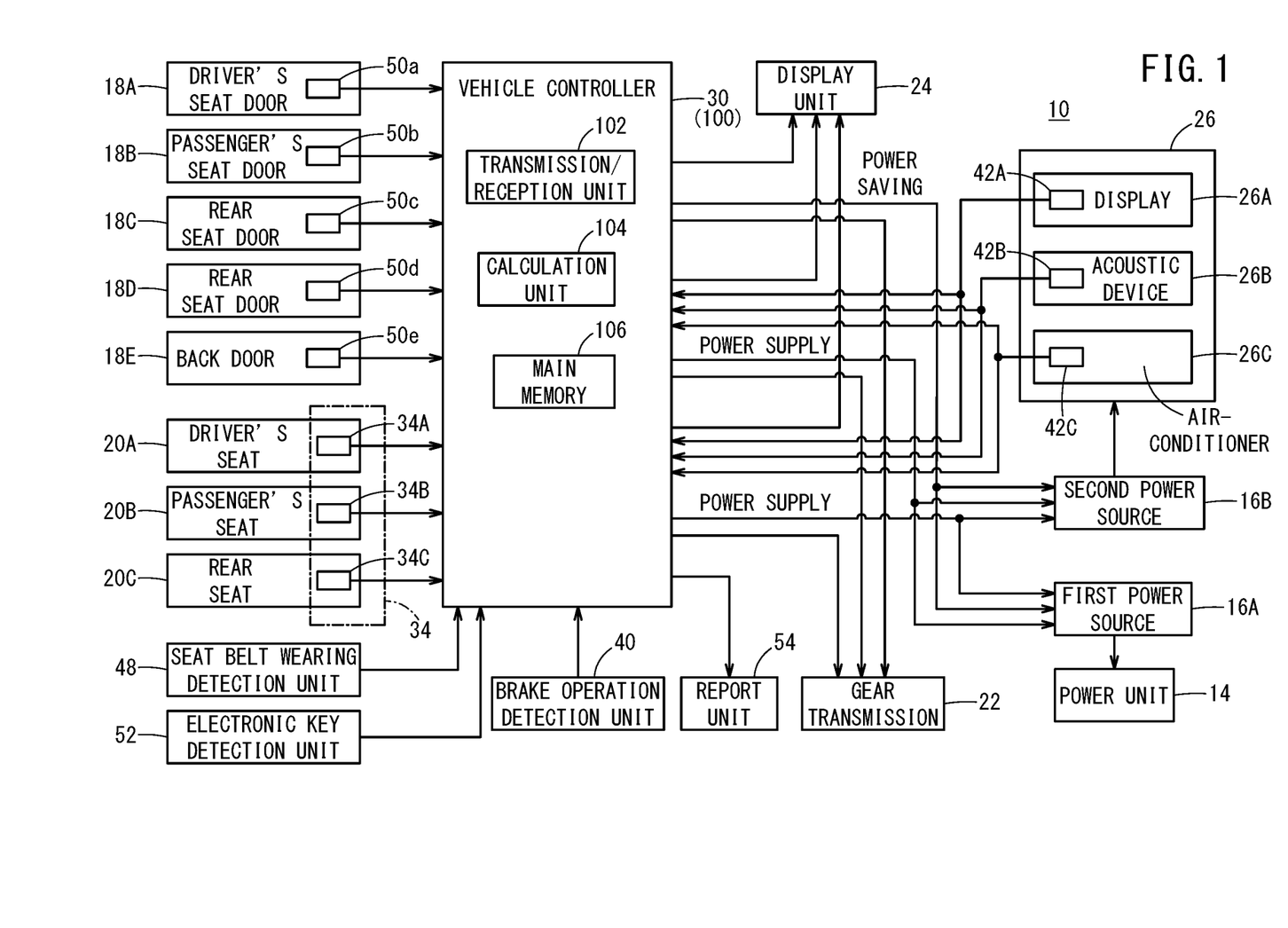
FIG. 1 is a block diagram illustrating a structure of a vehicle control device according to the present embodiment.
Figure 2:
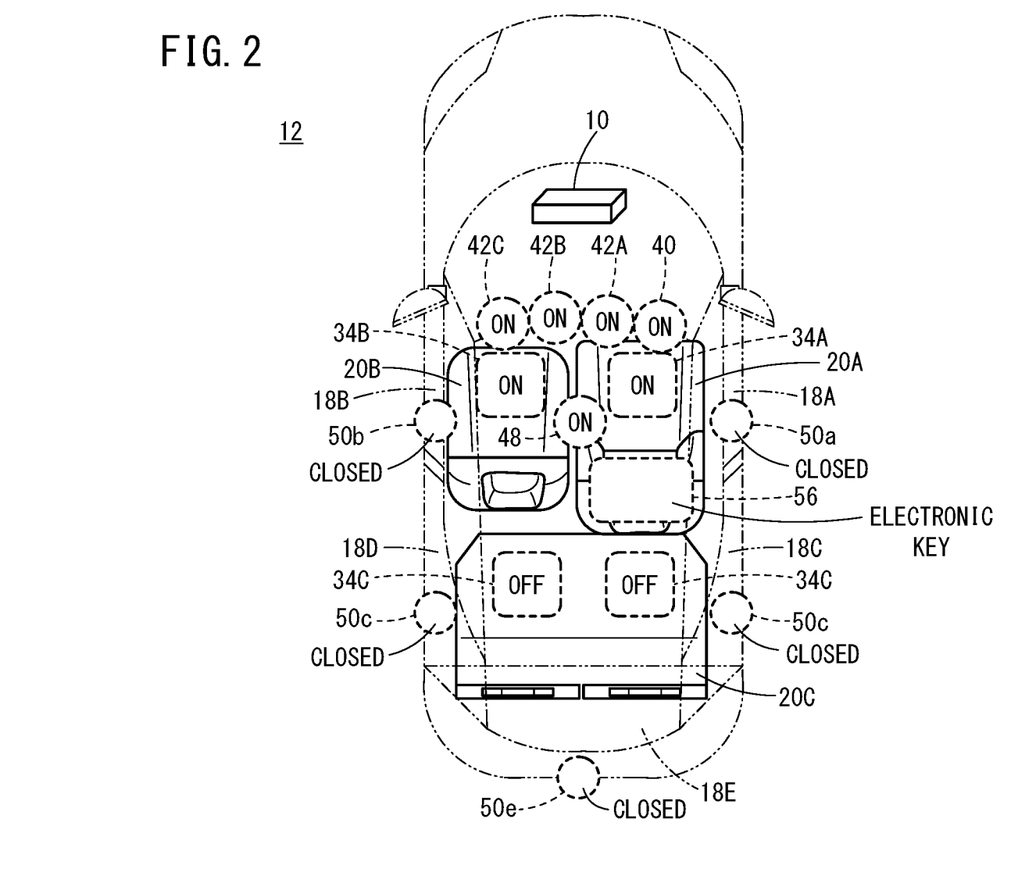
FIG. 2 is a schematic diagram illustrating one example of a vehicle including the vehicle control device when viewed from above.

As illustrated in FIG. 1 and FIG. 2, a vehicle 12 in which a vehicle control device 10 according to the present embodiment is used includes a drive source 14 (power unit), a first power source 16A (first battery) that supplies power to the drive source 14, at least two doors (in FIG. 1, five doors 18A to 18E), at least two seats (in FIG. 1, driver's seat 20A, passenger's seat 20B, and rear seat 20C), a gear transmission 22, a display unit 24 that shows a state of the vehicle 12, various electric components 26 (in FIG. 1, display 26A (such as a TV or a navigator), acoustic device 26B, air-conditioner 26C, or the like), and a second power source 16B (second battery) that supplies the power to the electric components 26. The drive source 14 may be an engine only, a motor only, or a combination of an engine and a motor, which corresponds to drive sources of a hybrid vehicle.

The vehicle control device 10 includes at least a vehicle controller 30 and a vehicle occupant detection unit 34.

The vehicle controller 30 is formed by a computer 100 including one or a plurality of central processing units (CPUs). The vehicle controller 30 includes a transmission/reception unit 102, a calculation unit 104, a main memory 106, and the like, and achieves various functions by causing the calculation unit 104 to execute programs stored in the main memory 106. That is to say, the vehicle controller 30 functions as a state transition unit 30 that makes at least five state transitions in accordance with an operation of the driver or the vehicle occupant, detection information from the vehicle occupant detection unit 34, or the like. This state transition will be described later.

The vehicle occupant detection unit 34 includes at least a driver's seat sitting detection unit 34A and a passenger's seat sitting detection unit 34B. The vehicle occupant detection unit 34 may be, for example, a pressure sensor or an infrared ray sensor that outputs an ON signal when the vehicle occupant (including a driver) is seated. The vehicle occupant detection unit 34 may additionally include a rear seat sitting detection unit 34C.

Moreover, the vehicle control device 10 includes a brake operation detection unit 40, a display operation detection unit 42A, an acoustic operation detection unit 42B, an air-conditioner operation detection unit 42C, a seat belt wearing detection unit 48, a first door opening and closing detection unit 50a to a fifth door opening and closing detection unit 50e (at least first door opening and closing detection unit 50a and second door opening and closing detection unit 50b), an electronic key detection unit 52, and a report unit 54.

The brake operation detection unit 40 may be, for example, an angle sensor or a pressure sensor that outputs an ON signal when a brake is operated by more than or equal to a predetermined operation amount. The display operation detection unit 42A, the acoustic operation detection unit 42B, and the air-conditioner operation detection unit 42C may be, for example, a power switch or a start switch of the display 26A, the acoustic device 26B, and the air-conditioner 26C. The seat belt wearing detection unit 48 may be, for example, a switch, a relay, or an optical sensor that outputs an ON signal when a seat belt is worn. Although an example in which the seat belt wearing detection unit 48 is provided to the driver's seat 20A is typically shown in FIG. 2, etc., the seat belt wearing detection unit 48 may also be provided to the passenger's seat 20B and the rear seat 20C.

The first door opening and closing detection unit 50a to the fifth door opening and closing detection unit 50e may be, for example, a relay or a switch that outputs an opening signal (ON signal or OFF signal) when a target door is opened, and outputs a closing signal (OFF signal or ON signal) when the target door is closed.

An electronic key 56 (see FIG. 2) to be detected by the electronic key detection unit 52 may be, for example, an electronic key of the driver. The electronic key detection unit 52 detects the electronic key 56 inside the vehicle by receiving a signal transmitted from the electronic key 56. In one example, the vehicle 12 includes some transmission antennas and an antenna whose transmission area is within the vehicle transmits a signal to the electronic key 56. The electronic key 56 having received the signal transmits a corresponding signal to the electronic key detection unit 52. When the electronic key detection unit 52 receives this signal, it is determined that the electronic key 56 is inside the vehicle. In another example, another antenna whose transmission area is out of the vehicle transmits a signal to the electronic key 56. The electronic key 56 having received the signal transmits a corresponding signal to the electronic key detection unit 52. When the electronic key detection unit 52 receives this signal, it is determined that the electronic key 56 is outside the vehicle. In still another example, the electronic key 56 inside the vehicle can be detected with a short range sensor using a beacon and the electronic key 56 outside the vehicle can be detected with a long range sensor using a GPS.

The report unit 54 communicates with (or reports to) an external device when a predetermined situation, which will be described below, occurs. Examples of the external device include a portable information terminal of the driver (including the electronic key 56).

Figure 3:
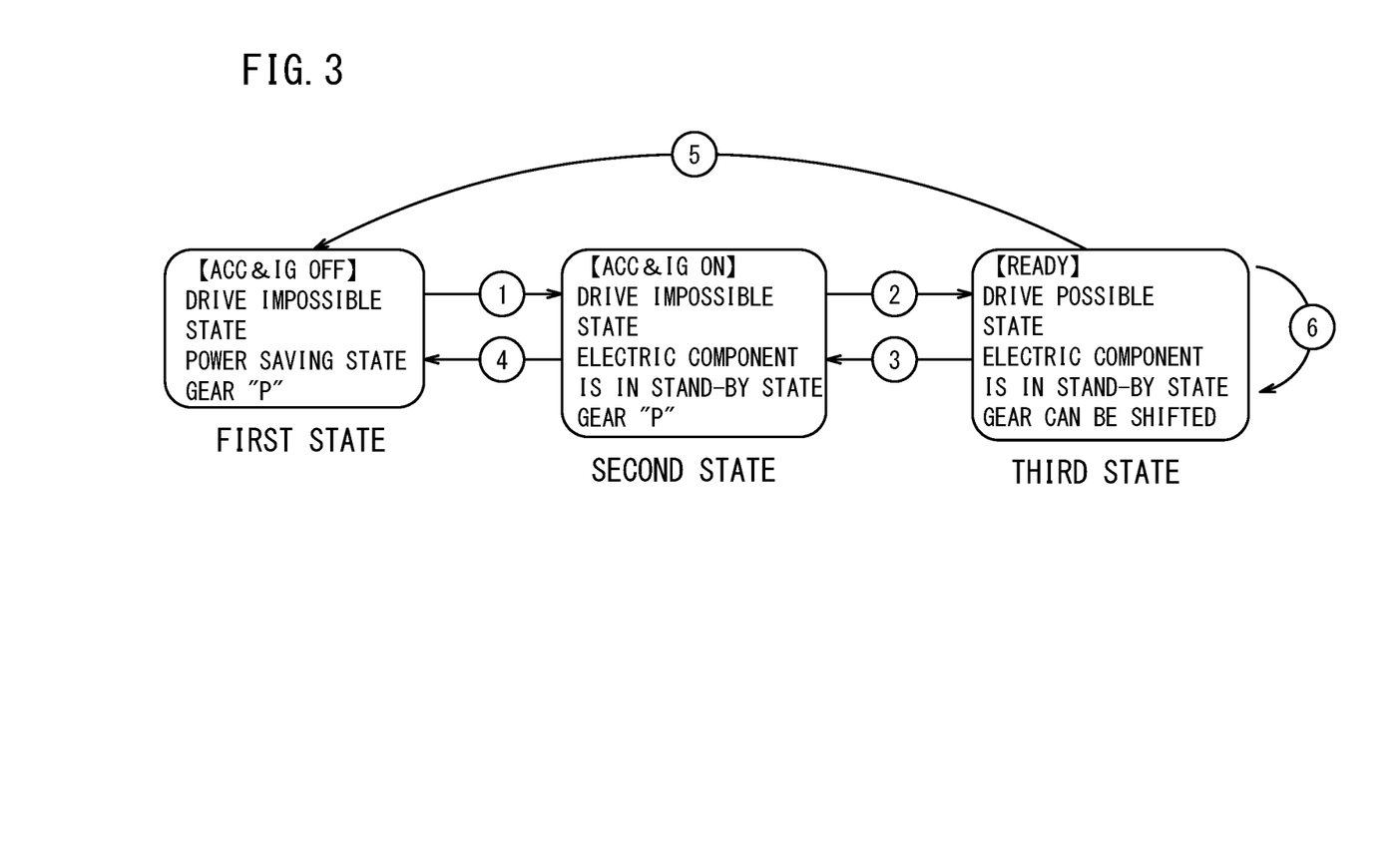
FIG. 3 is an explanatory diagram illustrating an example of a state transition among a first state, a second state, and a third state.

The vehicle controller 30 sets the vehicle 12 to any one of a first state, a second state, and a third state as illustrated in FIG. 3. The first state is a state where the vehicle 12 is in a drive impossible state and a power saving state. Specifically, the drive source 14 and the electric components 26 (the display 26A, the acoustic device 26B, the air-conditioner 26C, or the like) are stopped and the first power source 16A and the second power source 16B are set to the power saving state. In addition, the gear transmission 22 is set to parking "P". In this first state, the display unit 24 shows "ACC&IG OFF" indicating that the electric components 26 and the ignition are off.

The second state is a state where the vehicle 12 is in the drive impossible state and the electric components (accessories) 26 are in a stand-by state. Specifically, the drive source 14 is stopped and the first power source 16A is set to the power saving state. On the basis of various detection signals from the display operation detection unit 42A, the acoustic operation detection unit 42B, and the air-conditioner operation detection unit 42C, the second power source 16B supplies the power to the display 26A, the acoustic device 26B, and the air-conditioner 26C. In addition, the gear transmission 22 is set to parking "P". In this second state, the display unit 24 shows "ACC&IG ON" indicating that the electric components 26 and the ignition are ON.

The third state is a state where the vehicle 12 is in a drive possible state and the electric components 26 are in the stand-by state. Specifically, the first power source 16A supplies the power to the drive source 14 so that the vehicle 12 can drive. On the basis of various detection signals from the display operation detection unit 42A, the acoustic operation detection unit 42B, and the air-conditioner operation detection unit 42C, the second power source 16B supplies the power to the display 26A, the acoustic device 26B, and the air-conditioner 26C. In addition, the gear of the gear transmission 22 can be shifted in accordance with the instruction from the driver. In this third state, the display unit 24 shows "READY" indicating that the vehicle 12 can drive.

As indicated by arrows in FIG. 3, the vehicle controller 30 makes six state transitions (the first state transition to the sixth state transition) among the first state, the second state, and the third state on the basis of predetermined state transition conditions.

If a first state transition condition that is set in advance is satisfied, the vehicle controller 30 makes the state transition of the vehicle 12 from the first state to the second state. The first state transition condition is, for example, a condition 1-1 or a condition 1-2 as shown below, for example.

Figure 4:
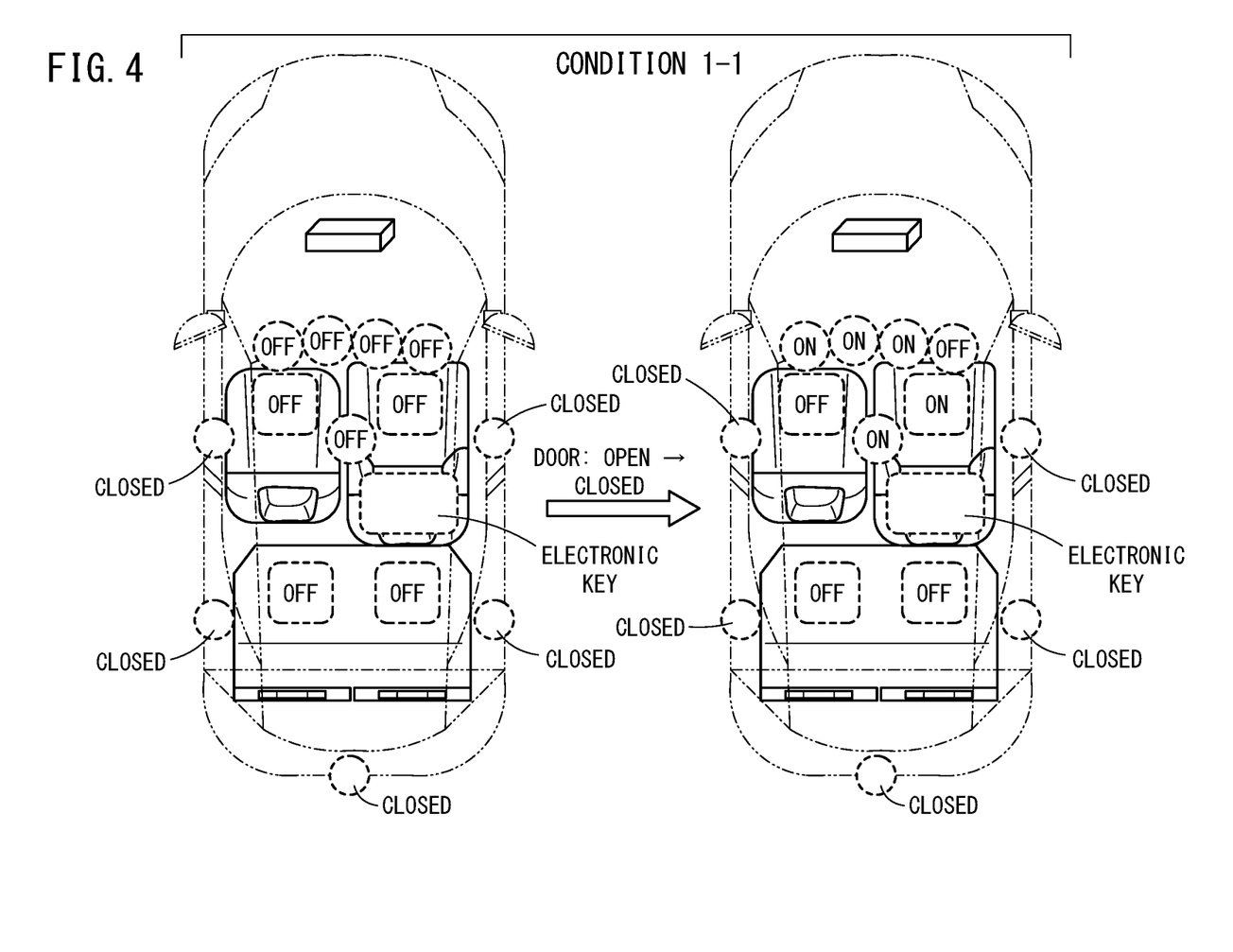
FIG. 4 is an explanatory diagram illustrating an example in which a state transition is made from the first state to the second state in accordance with a first state transition condition (condition 1-1)

[Condition 1-1]

The vehicle 12 is in the first state; the electronic key 56 is detected inside or outside the vehicle; at least one of the closed doors (all the doors were assumed to be closed initially) was opened and then all the doors are closed again (for example, the case the driver carrying the electronic key 56 gets in the vehicle) (see FIG. 4).

[Condition 1-2]

The vehicle 12 is in the first state; a vehicle occupant (either one or both of a driver and a fellow passenger) gets in the empty vehicle; and the electronic key 56 is detected inside the vehicle (the driver may carry the electronic key 56, or the fellow passenger may carry the electronic key 56 of the driver while the driver is absent).

If the condition 1-2 is satisfied and the vehicle 12 has become the second state, even though the driver is absent and only the fellow passenger is in the vehicle, the fellow passenger can use the display 26A, the acoustic device 26B, the air-conditioner 26C, or the like because the power is supplied to the electric components 26.

If a second state transition condition that is set in advance is satisfied, the vehicle controller 30 makes the state transition of the vehicle 12 from the second state to the third state. The second state transition condition is, for example, a condition 2 as shown below.

[Condition 2]

The vehicle 12 is in the second state; the electronic key 56 is detected inside the vehicle; and the driver is seated, wears the seat belt, and operates the brake.

If a third state transition condition that is set in advance is satisfied, the vehicle controller 30 makes the state transition of the vehicle 12 from the third state to the second state. The third state transition condition is, for example, a condition 3-1 or a condition 3-2 as shown below.

Figure 5:
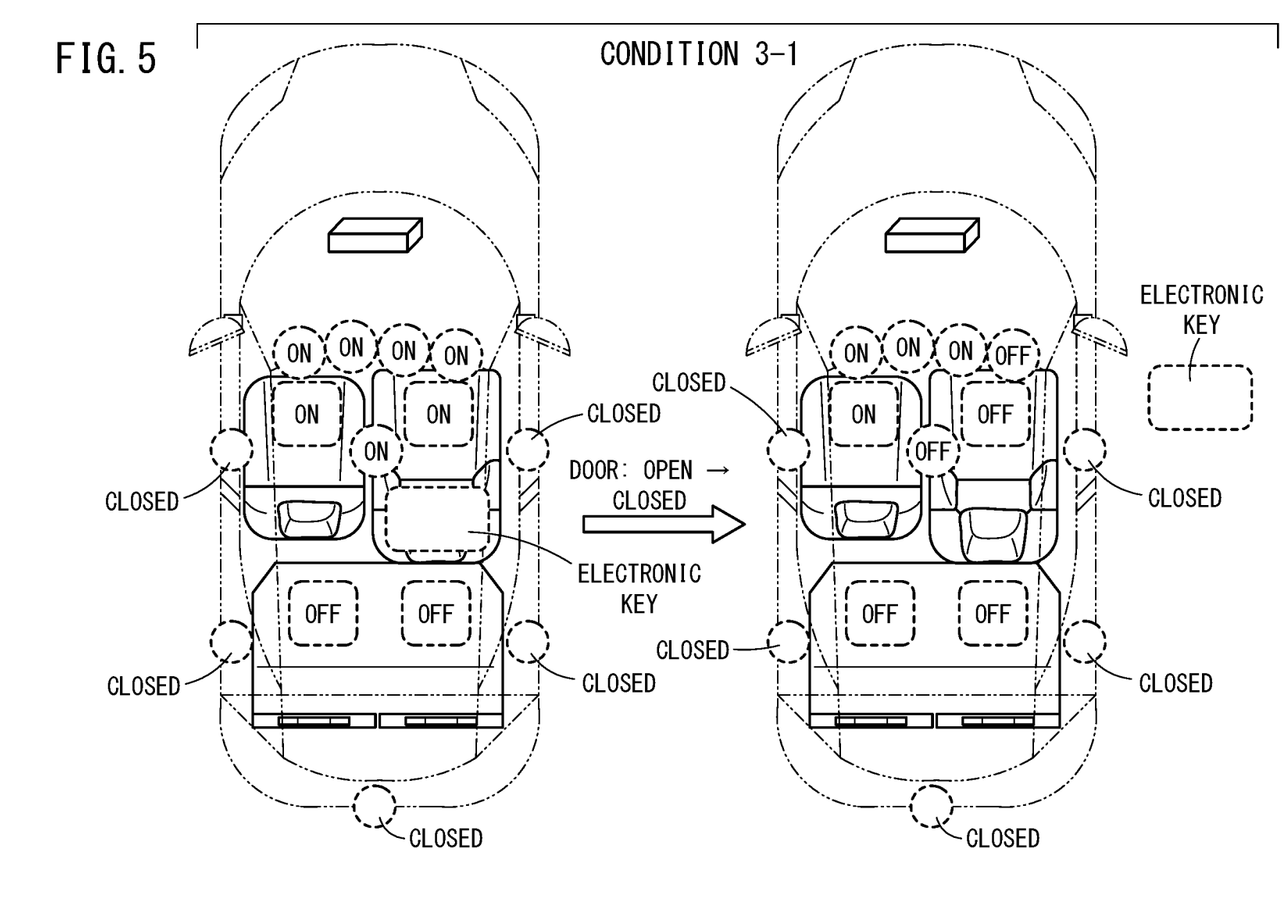
FIG. 5 is an explanatory diagram illustrating an example in which a state transition is made from the third state to the second state in accordance with a third state transition condition (condition 3-1)

[Condition 3-1]

The vehicle 12 is in the third state and is stopped; all the doors, at least one of which was open, are now closed; the electronic key 56 is not detected inside the vehicle (or the electronic key 56 is detected outside the vehicle); and not the driver but the fellow passenger is in the vehicle (see FIG. 5).

[Condition 3-2]

The vehicle 12 is in the third state and is stopped; the electronic key 56 is not detected inside the vehicle (or the electronic key 56 is detected outside the vehicle); not the driver but the fellow passenger is in the vehicle; and a predetermined time has elapsed.

The predetermined time is set in consideration of the power consumption while the vehicle 12 stands by in the drive possible state, and may be, for example, two to five minutes.

If the condition 3-1 or the condition 3-2 is satisfied and the vehicle 12 has become the second state, even though the driver is absent, the fellow passenger can use the display 26A, the acoustic device 26B, the air-conditioner 26C, or the like because the power is supplied to the electric components 26.

If a fourth state transition condition that is set in advance is satisfied, the vehicle controller 30 makes the state transition of the vehicle 12 from the second state to the first state. The fourth state transition condition is, for example, a condition 4-1, a condition 4-2, or a condition 4-3 as shown below.

Figure 6:
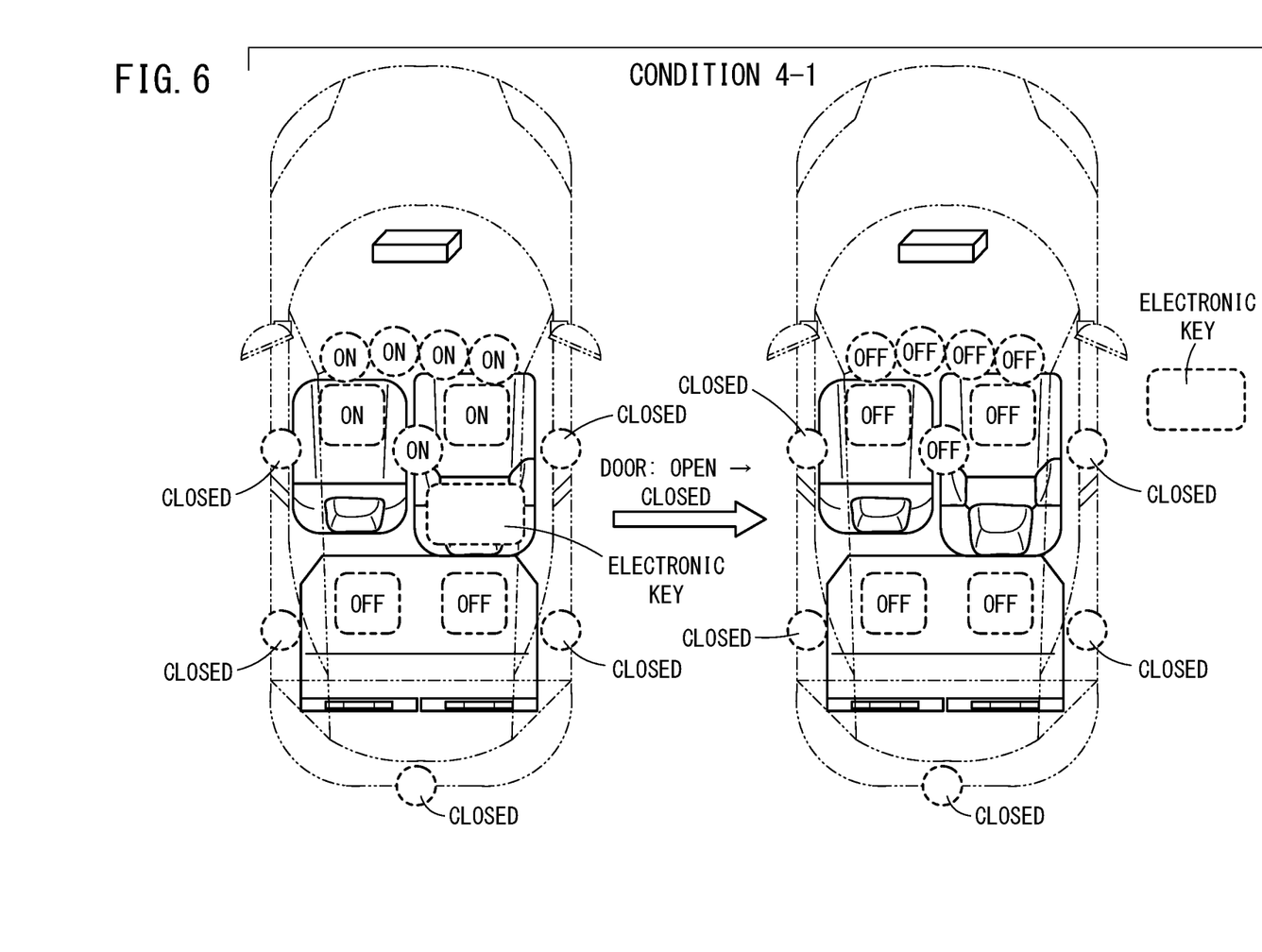
FIG. 6 is an explanatory diagram illustrating an example in which a state transition is made from the second state to the first state in accordance with a fourth state transition condition (condition 4-1)

[Condition 4-1]

The vehicle 12 is in the second state and is stopped; all the doors, at least one of which was open, are closed; the electronic key 56 is not detected inside the vehicle (or the electronic key 56 is detected outside the vehicle); and the passengers (the driver and the fellow passenger) are not in the vehicle (see FIG. 6).

[Condition 4-2]

The vehicle 12 is in the second state and is stopped; the electronic key 56 is not detected inside the vehicle (or the electronic key 56 is detected outside the vehicle); the passengers (the driver and the fellow passenger) are not in the vehicle; and the predetermined time has elapsed.

Figure 7:
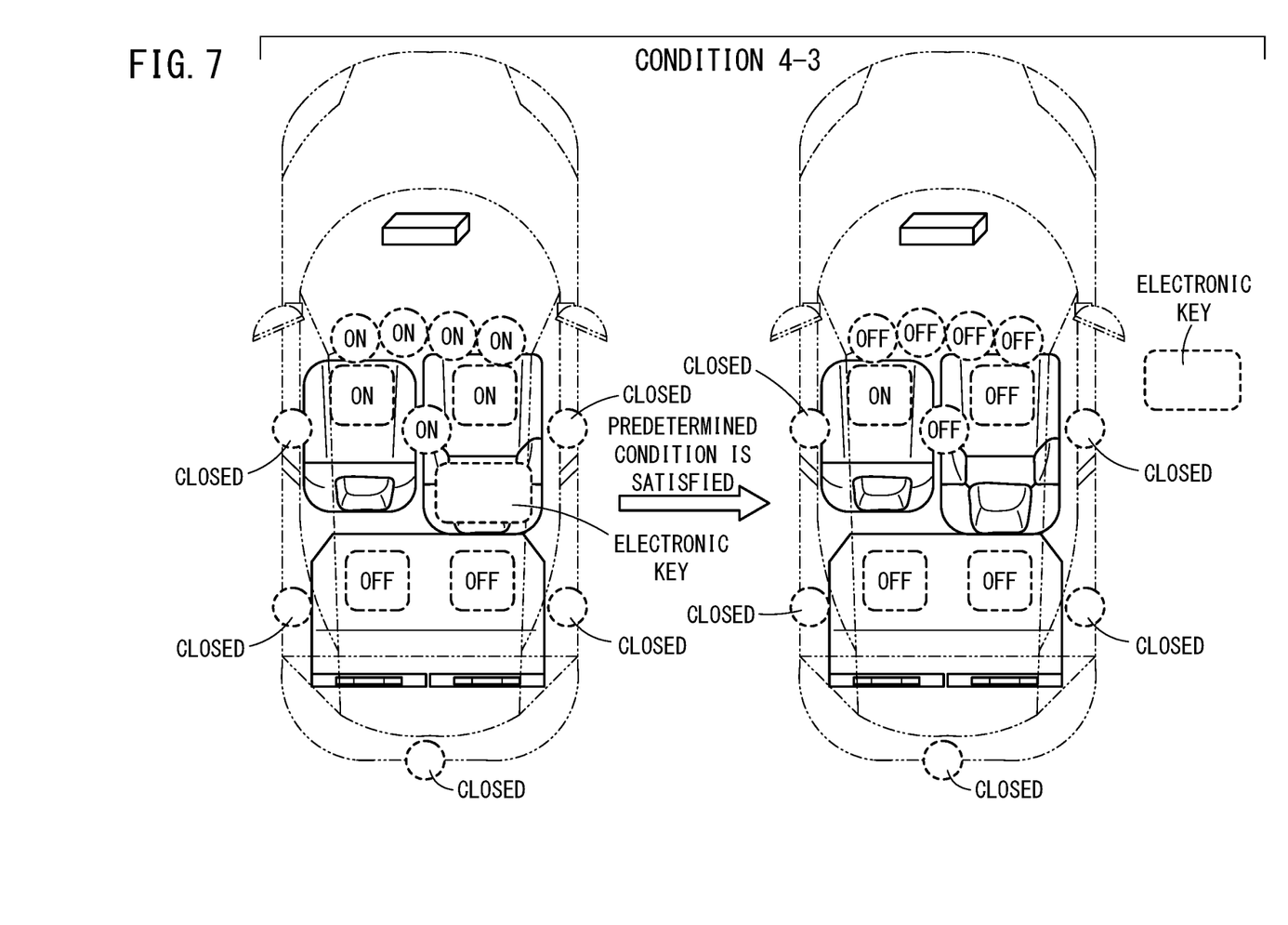
FIG. 7 is an explanatory diagram illustrating an example in which a state transition is made from the second state to the first state in accordance with the fourth state transition condition (condition 4-3)

[Condition 4-3]

The vehicle 12 is in the second state and is stopped; the electronic key 56 is not detected inside the vehicle (or the electronic key 56 is detected outside the vehicle); the passenger (fellow passenger) is in the vehicle; and a predetermined condition is satisfied (see FIG. 7).

The predetermined condition is a condition in which a time Tmax that is set in advance has passed from a time point when the state became the second state, or in which a current state of charge (SOC, charging rate) of the second power source 16B (battery) has become less than or equal to a charging rate SOCmin (threshold) that is set in advance. The first power source 16A and the second power source 16B may be combined into a single power source (battery). In this case, the predetermined condition is a condition in which the current SOC (charging rate) of the single power source has become less than or equal to the charging rate SOCmin (threshold) that is set in advance.

If a fifth state transition condition that is set in advance is satisfied, the vehicle controller 30 makes the state transition of the vehicle 12 from the third state to the first state. The fifth state transition condition is, for example, a condition 5-1 or a condition 5-2 as shown below.

Figure 8:
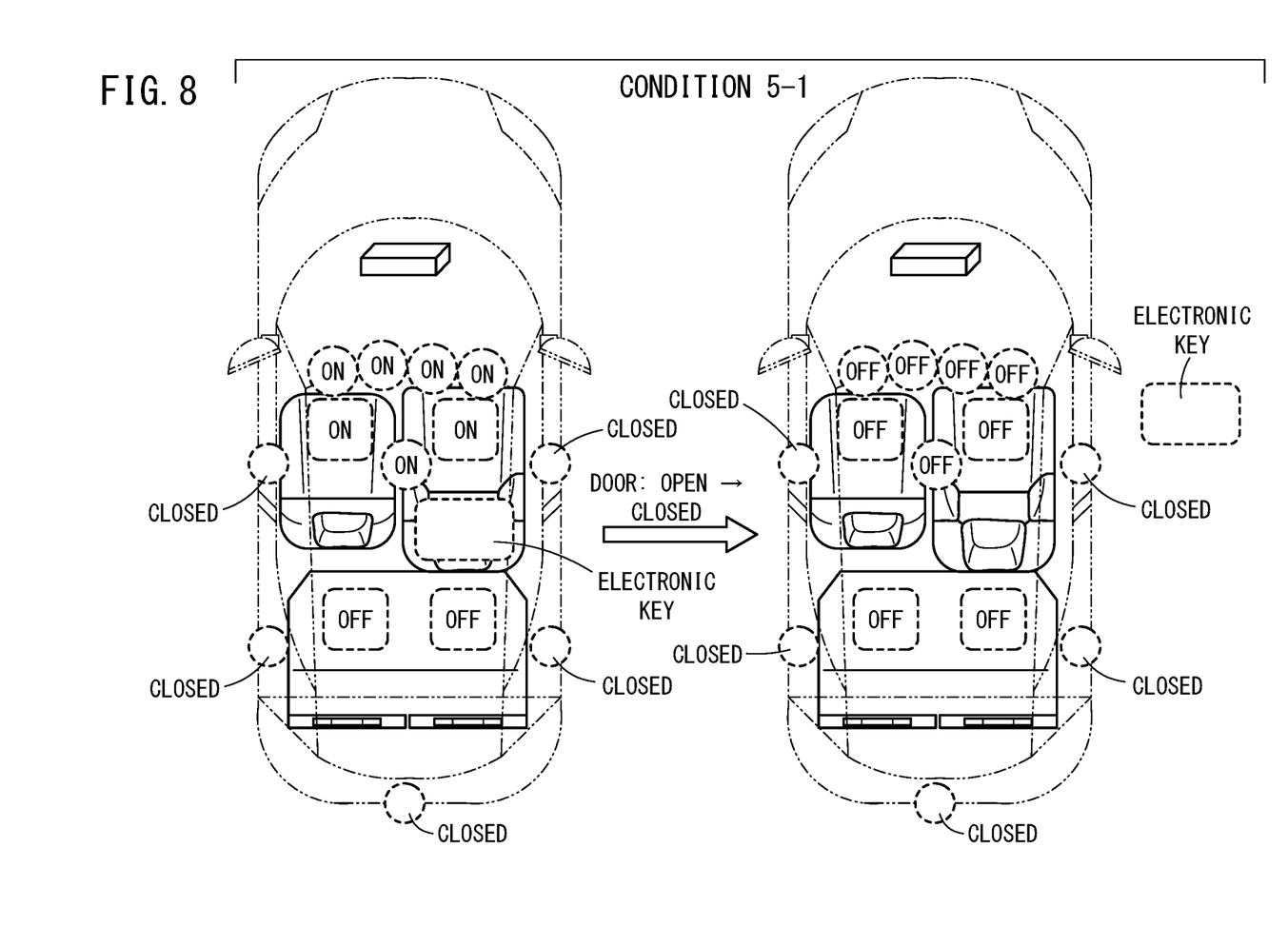
FIG. 8 is an explanatory diagram illustrating an example in which a state transition is made from the third state to the first state in accordance with a fifth state transition condition (condition 5-1)

[Condition 5-1]

The vehicle 12 is in the third state and is stopped; all the doors, at least one of which was open, are closed; the electronic key 56 is not detected inside the vehicle (or the electronic key 56 is detected outside the vehicle); and the vehicle occupants (the driver and the fellow passenger) are not in the vehicle (in the ordinary getting off of the vehicle, see FIG. 8).

[Condition 5-2]

The vehicle 12 is in the third state and is stopped; the electronic key 56 is not detected inside the vehicle (or the electronic key 56 is detected outside the vehicle); the vehicle occupants (the driver and the fellow passenger) are not in the vehicle; and the predetermined time has elapsed.

If a sixth state transition condition that is set in advance is satisfied, the vehicle controller 30 maintains the third state. The sixth state transition condition is, for example, a condition 6 as shown below.

Figure 9:
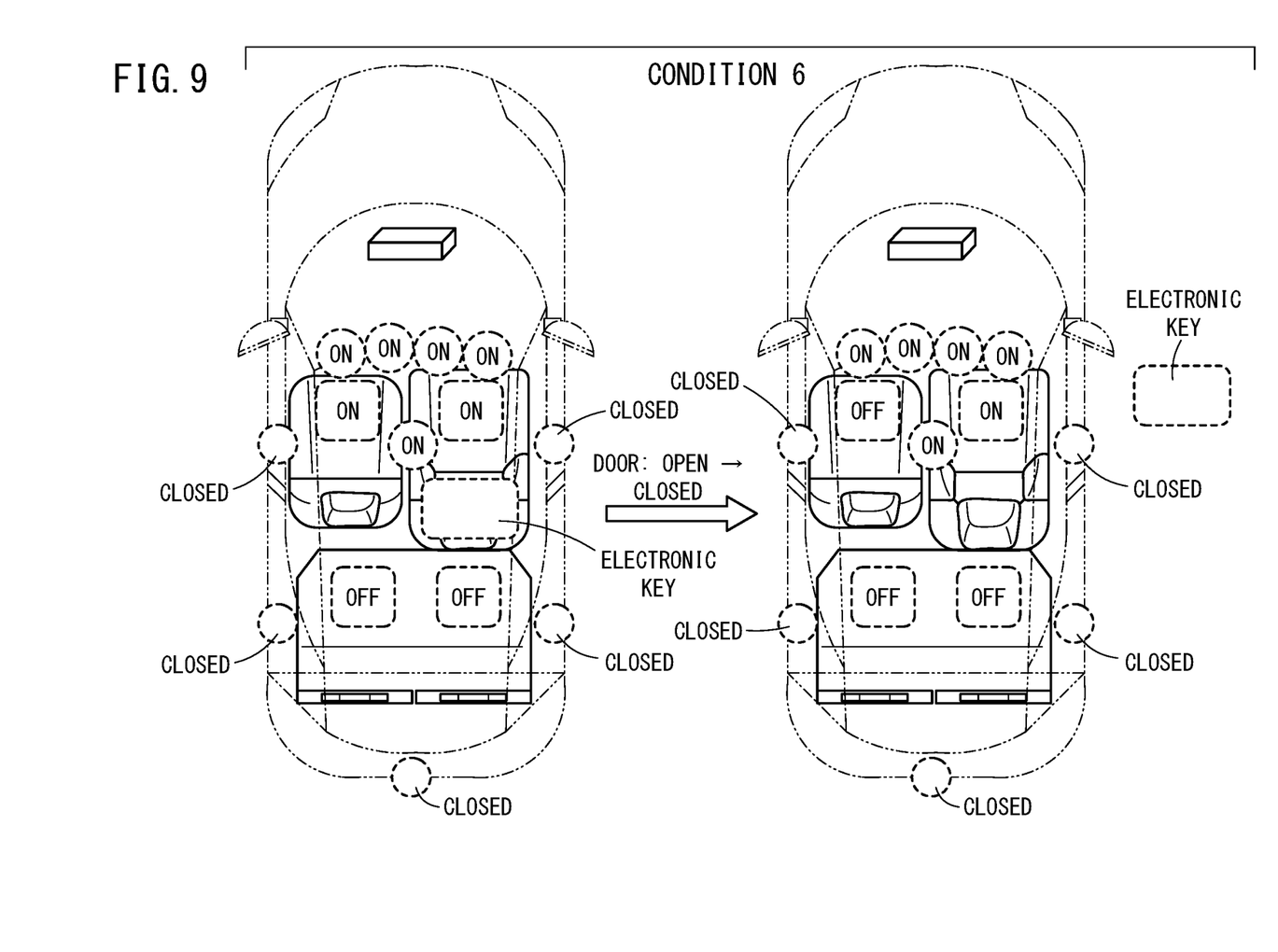
FIG. 9 is an explanatory diagram illustrating an example in which the third state is maintained in accordance with a sixth state transition condition (condition 6)

[Condition 6]

The vehicle 12 is in the third state and is stopped; all the doors, at least one of which was open, are closed; the electronic key 56 is not detected inside the vehicle (or the electronic key 56 is detected outside the vehicle); and the driver is seated (see FIG. 9).

Next, a processing operation of the vehicle control device 10 is described with reference to FIG. 10.

Figure 10:
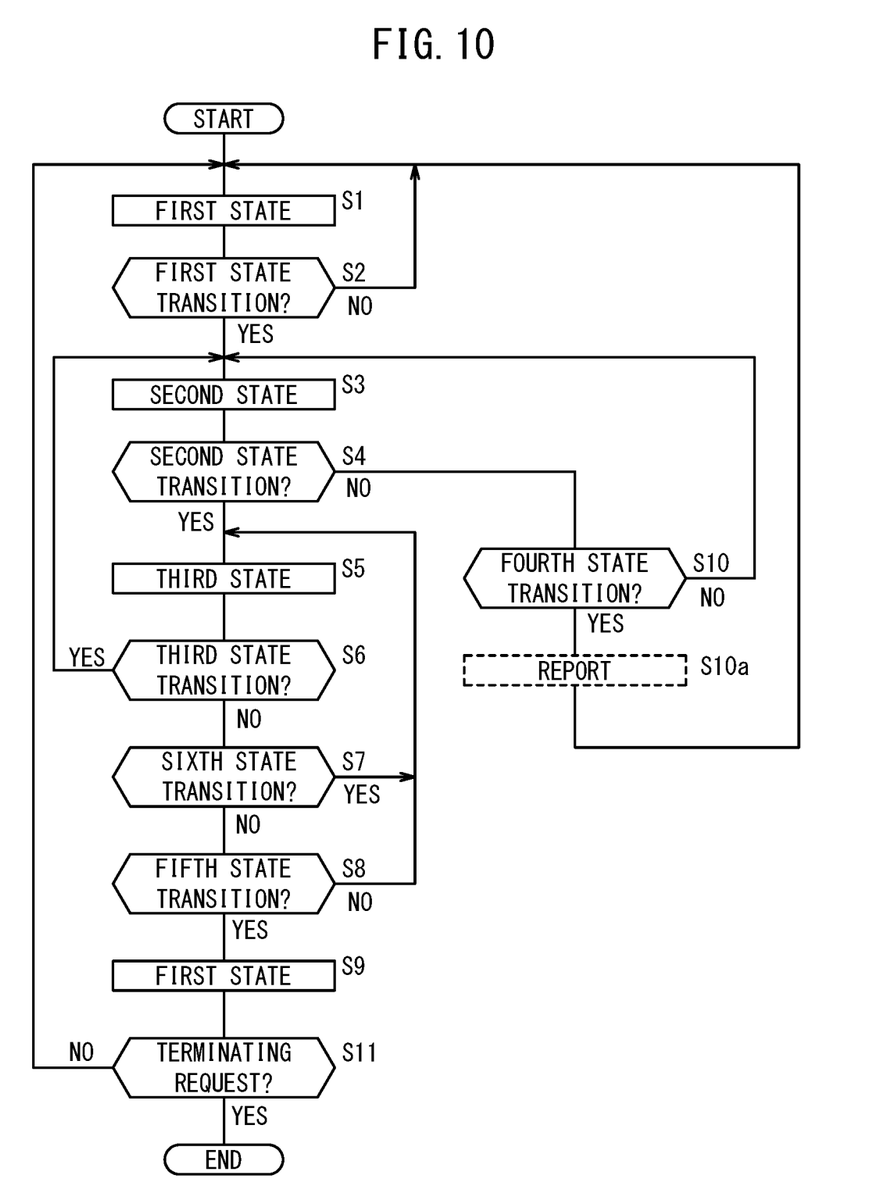
FIG. 10 is a flowchart of a processing operation of the vehicle control device.

First, in step S1 in FIG. 10, the vehicle controller 30 sets the vehicle 12 to the first state. That is to say, the drive source 14 and the electric components 26 (the display 26A, the acoustic device 26B, the air-conditioner 26C, and the like) are stopped and the first power source 16A and the second power source 16B are set to a power saving state. In addition, the gear transmission 22 is set to parking "P". The display unit 24 shows "ACC&IG OFF".

In step S2, the vehicle controller 30 determines whether the state of the vehicle 12 satisfies the first state transition condition. If the first state transition condition is not satisfied (step S2: NO), the first state is maintained. If the first state transition condition is satisfied (step S2: YES), the process advances to the next step S3 and the vehicle controller 30 sets the vehicle 12 to the second state. That is to say, the vehicle 12 is set to a drive impossible state and the electric components 26 (accessories) are set to a stand-by state. The second power source 16B supplies the power to the display 26A, the acoustic device 26B, and the air-conditioner 26C. In addition, the gear transmission 22 is set to parking "P". The display unit 24 shows "ACC&IG ON".

In step S4, the vehicle controller 30 determines whether the state of the vehicle 12 satisfies the second state transition condition. If the second state transition condition is satisfied (step S4: YES), the process advances to the next step S5 and the vehicle controller 30 sets the vehicle 12 to the third state. That is to say, the vehicle 12 is set to the drive possible state and the accessories are set to the stand-by state. The display unit 24 shows "READY" indicating that the vehicle 12 can drive.

In step S6, the vehicle controller 30 determines whether the state of the vehicle 12 satisfies the third state transition condition. If the third state transition condition is satisfied (step S6: YES), the process returns to the step S3 and the vehicle controller 30 sets the vehicle 12 to the second state. Thus, the processes of step S3 and thereafter are repeated. That is to say, if the vehicle 12 is in the second state, even though the driver is absent, the fellow passenger can use the display 26A, the acoustic device 26B, the air-conditioner 26C, and the like because the power is supplied to the electric components 26.

If it is determined that the state of the vehicle 12 does not satisfy the third state transition condition in step S6 (step S6: NO), the process advances to step S7 where the vehicle controller 30 determines whether the state of the vehicle 12 satisfies the sixth state transition condition. If the sixth state transition condition is satisfied (step S7: YES), the process returns to step S5 and the third state is maintained.

If it is determined that the state of the vehicle 12 does not satisfy the sixth state transition condition in step S7 (step S7: NO), the process advances to step S8 where the vehicle controller 30 determines whether the state of the vehicle 12 satisfies the fifth state transition condition. If it is determined that the state of the vehicle 12 does not satisfy the fifth state transition condition (step S8: NO), the process returns to step S5 and the third state is maintained.

If it is determined that the state of the vehicle 12 satisfies the fifth state transition condition in step S8 (step S8: YES), the process advances to step S9 where the vehicle controller 30 sets the vehicle 12 to the first state.

On the other hand, if it is determined that the state of the vehicle 12 does not satisfy the second state transition condition in step S4 (step S4: NO), the process advances to step S10 where the vehicle controller 30 determines whether the state of the vehicle 12 satisfies the fourth state transition condition. If the fourth state transition condition is satisfied (step S10: YES), the process returns to step S1 and the processes of step S1 and thereafter are repeated. If the fourth state transition condition is not satisfied (step S10: NO), the process returns to step S3 and the second state is maintained.

In step S11, whether there is a terminating request (power cut, maintenance, etc.) is determined. If there is no terminating request (step S11: NO), the processes of step S1 and thereafter are repeated. If there is a terminating request (step S11: YES), the process in the vehicle control device 10 is terminated.

If it is determined that the state of the vehicle 12 satisfies the fourth state transition condition in step S10, the report unit 54 may report to the external device (a portable information terminal of the driver, for example) in step S10a.

Figure 11A:
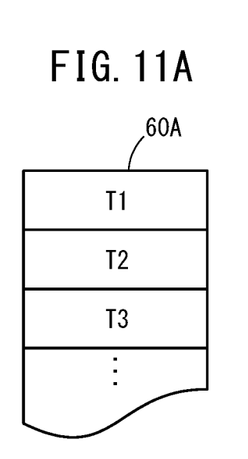
FIG. 11A is an explanatory diagram illustrating one example of a first information file used when a plurality of electric components is stopped by stages.
Figure 11B:
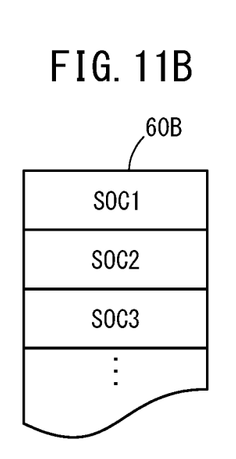
FIG. 11B is an explanatory diagram illustrating one example of a second information file similarly.
Figure 11C:
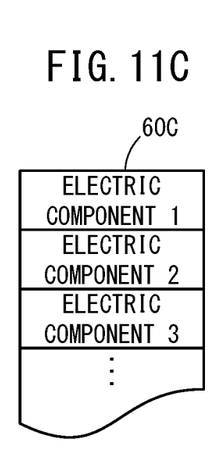
FIG. 11C is an explanatory diagram illustrating one example of a third information file similarly.
Figure 12:
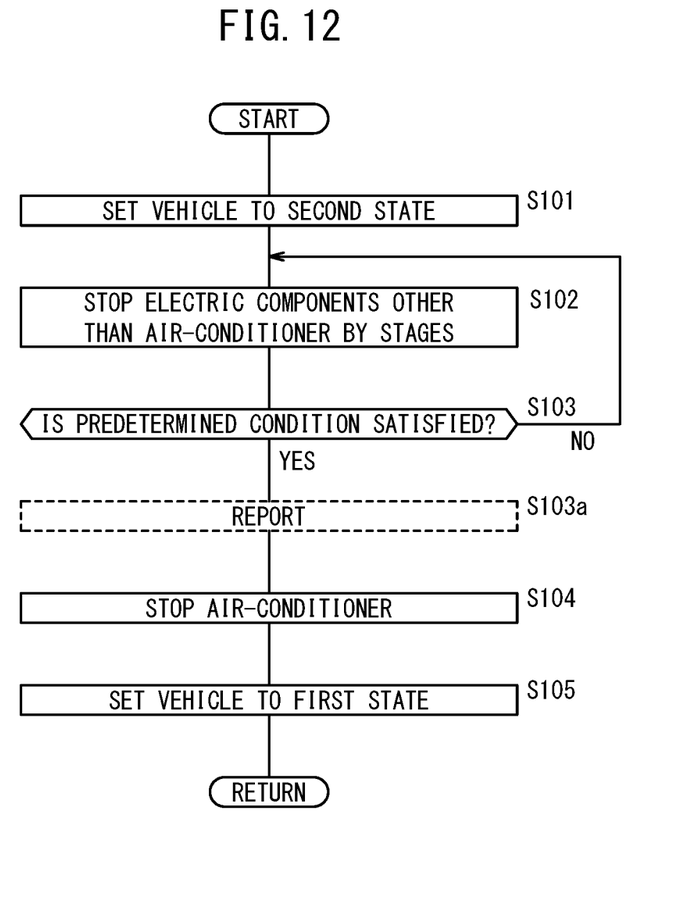
FIG. 12 is a flowchart showing the example in which the electric components are stopped by stages.

Next, with reference to FIG. 11A to FIG. 12, description is given concerning a modification in which the state transition from the second state to the first state is made when the fourth state transition condition is satisfied.

In the state transition from the second state to the first state that is made when the fourth state transition condition is satisfied, the electric components 26 are stopped by stages as time elapses, or the electric components 26 are stopped by stages as the SOC (charging rate) of the second power source 16B decreases. If a time that is set in advance has elapsed from the time point when the state became the second state or if the current SOC of the second power source 16B has become less than or equal to a charging rate (threshold) that is set in advance, the state becomes the first state.

The vehicle controller 30 according to the modification includes an information file used when the electric components 26 are stopped by stages. The information file includes a first information file 60A in which a plurality of pieces of elapsed time information T1, T2, T3 . . . are registered in order as illustrated in FIG. 11A, or a second information file 60B in which a plurality of pieces of SOC information SOC1, SOC2, SOC3 . . . are registered in order as illustrated in FIG. 11B. In addition, the vehicle controller 30 includes a third information file 60C in which a plurality of pieces of information regarding the electric components 26 that are stopped by stages (an electric component 1, an electric component 2, an electric component 3 . . . ) are registered in order as illustrated in FIG. 11C.

The pieces of elapsed time information (time T1, time T2, time T3 . . . ) in the first information file 60A are in the relation of T1<T2<T3 . . . . The pieces of SOC information (SOC1, SOC2, SOC3 . . . ) in the second information file 60B are in the relation of SOC1>SOC2>SOC3 . . . .

Here, description is given concerning a processing operation of the vehicle controller 30 according to the modification with reference to FIG. 12.

First, in step S101, the vehicle controller 30 sets the vehicle 12 to the second state. After that, in step S102, the vehicle controller 30 performs a process of stopping the electric components 26 other than the air-conditioner 26C by stages.

In this process of stopping the electric components 26 by stages, if the elapsed time after the state became the second state is over the time T1 registered in the first information file 60A, the electronic component 1 registered in the third information file 60C is stopped and then, after the time T2 has elapsed, the electric component 2 is stopped. Subsequently, after the time T3 has elapsed, the electric component 3 is stopped.

Alternatively, when the current SOC of the second power source 16B becomes less than or equal to SOC1 registered in the second information file 60B, the electric component 1 registered in the third information file 60C is stopped and then, when the SOC becomes less than or equal to SOC2, the electric component 2 is stopped. Subsequently, when the SOC becomes less than or equal to SOC3, the electric component 3 is stopped.

Next, when the predetermined condition is satisfied in step S103, the process advances to step S104 where the vehicle controller 30 stops the air-conditioner 26C. After that, in step S105, the vehicle controller 30 sets the vehicle 12 to the first state.

Note that when the predetermined condition is satisfied in step S103, the report unit 54 may report to the external device (a portable information terminal of the driver, for example) in step S103a.

[Invention Obtained from Embodiment]

As described above, the vehicle control device 10 according to the present embodiment includes the vehicle controller 30 configured to, if the predetermined state transition condition is satisfied, make the state transition of the vehicle 12 from the drive possible state to the drive impossible state, and the vehicle occupant detection unit 34 configured to detect the vehicle occupant in the vehicle 12. The vehicle controller 30 is configured to make the state transition to the drive impossible state that is different depending on the detection result from the vehicle occupant detection unit 34. Thus, it is possible to perform the state transition control suitably in accordance with the situation in the vehicle, even without intention of starting to drive immediately.

In the present embodiment, if the predetermined state transition condition is satisfied and the vehicle occupant detection unit 34 has detected the vehicle occupant in the vehicle 12, the vehicle controller 30 is configured to make the state transition to the first drive impossible state (second state) in which, of the electric components 26 in the vehicle 12 and the drive source 14 of the vehicle 12, only the drive source 14 of the vehicle 12 is deactivated. Moreover, if the predetermined state transition condition is satisfied and the vehicle occupant detection unit 34 has not detected the vehicle occupant in the vehicle 12, the vehicle controller 30 is configured to make the state transition to the second drive impossible state (first state) in which both the electric components 26 in the vehicle 12 and the drive source 14 of the vehicle 12 are deactivated.

By the above state transitions, it is possible to perform the power source control suitably in accordance with the situation in the vehicle. For example, if the vehicle occupant remains in the vehicle, the vehicle occupant can use the air-conditioner 26C or watch TV or the like. Thus, the vehicle occupant feels comfortable in the vehicle.

In the present embodiment, the vehicle occupant detection unit 34 is configured to determine whether the detected vehicle occupant is the vehicle occupant in the driver's seat 20A or the vehicle occupant in the other seat.

Then, if the vehicle occupant detected by the vehicle occupant detection unit 34 includes the vehicle occupant in the driver's seat 20A, the vehicle controller 30 is configured to determine that the predetermined state transition condition is not satisfied.

Thus, this process is effective because the vehicle 12 in which the driver remains may continue driving.

In the present embodiment, the vehicle control device 10 includes the electronic key detection unit 52 configured to detect whether there is the electronic key 56. Then, the vehicle controller 30 is configured to determine that the predetermined state transition condition is satisfied when the electronic key detection unit 52 has detected at least one of the following: the electronic key 56 does not exist inside the vehicle 12; and the electronic key 56 exists outside the vehicle 12. Thus, it is possible to handle the situation in which the vehicle 12 should be in the drive impossible state.

In the present embodiment, the vehicle control device 10 includes the door opening and closing detection unit 50a to 50e configured to detect whether the door 18A to 18E of the vehicle 12 is open or closed. Then, the vehicle controller 30 is configured to determine that the predetermined state transition condition is satisfied when the door opening and closing detection unit 50a to 50e has detected that the door is changed from the open state to the closed state. Thus, it is possible to handle the situation in which the vehicle 12 should be in the drive impossible state.

In the present embodiment, when the predetermined condition is satisfied after the state becomes the first drive impossible state (second state), the vehicle controller 30 is configured to make the state transition to the second drive impossible state (first state).

After the state becomes the second state and before the predetermined condition is satisfied, the vehicle occupant feels comfortable. However, after a certain time has elapsed to such an extent that it may seriously affect the residual quantity of the second power source 16B, the power consumption of the second power source 16B is stopped. Therefore, the excessive power consumption of the second power source 16B is suppressed. Needless to say, in the case where the first power source and the second power source are combined into a single power source, after time that may seriously affect the residual quantity of the single power source has elapsed, the power consumption of the single power source is stopped. Therefore, the excessive power consumption of the single power source is suppressed.

In the present embodiment, after the state becomes the first drive impossible state (second state) and before the predetermined condition is satisfied, the vehicle controller 30 is configured to stop the electric components 26 by stages.

If the electric component 26 includes the air-conditioner 26C and the electric components other than the air-conditioner 26C (the display 26A, the acoustic device 26B, or the like), for example, the electric components other than the air-conditioner 26C are stopped by stages. Then, when the state becomes the second drive impossible state (first state), the air-conditioner 26C is stopped. That is to say, all the electric components 26 are stopped. Thus, when the SOC residual quantity of the second power source 16B is less than or equal to a threshold that is set in advance as the predetermined condition, the electric components 26 are stopped by stages after the state becomes the first drive impossible state (second state). Therefore, the decrease of the SOC residual quantity with respect to the time elapse is suppressed so that the duration of the first drive impossible state (second state) is secured. Therefore, the vehicle occupant feels comfortable in the vehicle as long as possible.

In the present embodiment, the vehicle control device 10 includes the report unit 54 configured to report to the external device that is set in advance. When the predetermined condition is satisfied after the state becomes the first drive impossible state (second state), the vehicle controller 30 is configured to cause the report unit 54 to perform predetermined communication with the external device.

When a time period that the vehicle occupant feels comfortable in the vehicle elapses, the report unit 54 communicates with the external device that is set in advance (a portable information terminal of the driver, for example) so as to call the driver back to the vehicle 12, for example. The external device may be a communications device of a public institution. If the vehicle occupant is a child, it can be prevented that the child is left in the vehicle for a long time.

The present invention is not limited to the embodiment above, and can be changed freely within the range not departing from the concept of the present invention.

What is claimed is:

1. A vehicle control device comprising:
   one or more processors that execute computer-executable instructions stored in a memory, and
   a vehicle occupant detection sensor that detects and determines a presence or an absence of a vehicle occupant in a driver's seat and a presence or an absence of a vehicle occupant other than the driver in a seat other than the driver's seat in the vehicle, and provides occupant sensor data to the one or more processors individually indicative of the presence or the absence of the vehicle occupant in the driver's seat and the presence or the absence of the vehicle occupant in the seat other than the driver's seat in the vehicle,
   wherein the one or more processors execute the computer-executable instructions to:
      transition a state of the vehicle between one of:
         a drive possible state in which a drive source of the vehicle is active,
         a first drive impossible state in which one or more electric components in the vehicle are active and the drive source of the vehicle is inactive, and
         a second drive impossible state in which both the one or more electric components in the vehicle and the drive source of the vehicle are inactive;
      determine that a predetermined state transition condition is satisfied;
      transition, in response to determining that the predetermined state transition condition is not satisfied, into the drive possible state based on occupant sensor data from the vehicle occupant detection sensor being indicative of the presence of the vehicle occupant in the driver's seat in the vehicle;
      transition, in response to determining that the predetermined state transition condition is satisfied, into the first drive impossible state based on occupant sensor data from the vehicle occupant detection sensor being indicative of the presence of the vehicle occupant in the seat other than the driver's seat and the absence of the vehicle occupant in the driver's seat in the vehicle; and
      transition, in response to determining that the predetermined state transition condition is satisfied, into the second drive impossible state based on occupant sensor data from the vehicle occupant detection sensor being indicative of the absence of the vehicle occupant in the seat other than the driver's seat and the absence of the vehicle occupant in the driver's seat in the vehicle.

2. The vehicle control device according to claim 1, wherein the one or more electric components include at least an air-conditioner.

3. The vehicle control device according to claim 1, wherein the one or more processors receive electronic key detection information indicative of a presence of an electronic key outside of the vehicle or an absence of the electronic key inside of the vehicle,
   wherein the one or more processors determine that the predetermined state transition condition is satisfied based on the electronic key detection information being indicative of at least one of the following: the absence of the electronic key inside the vehicle; and the presence of the electronic key outside the vehicle.

4. The vehicle control device according to claim 1, wherein the one or more processors receive door opening and closing information indicative of whether a door of the vehicle is in an open state or a closed state, wherein the one or more processors determine that the predetermined state transition condition is satisfied when the door opening and closing information changes from being indicative of the open state to being indicative of the closed state.

5. The vehicle control device according to claim 1, wherein when a predetermined condition is satisfied after transitioning to the first drive impossible state, the one or more processors transition to the second drive impossible state.

6. The vehicle control device according to claim 5, further comprising a report unit configured to report to an external device that is set in advance,
   wherein when the predetermined condition is satisfied after transitioning to the first drive impossible state, the one or more processors perform predetermined communication with the external device that is set in advance.

7. The vehicle control device according to claim 1, wherein after transitioning to the first drive impossible state, the one or more processors stop the one or more electric components by stages.

8. The vehicle control device according to claim 1, wherein the vehicle occupant detection sensor is determining the presence or absence of both the vehicle occupant in the driver's seat and the vehicle occupant in the seat other than the driver's seat simultaneously at the time that the predetermined state condition is satisfied.

* * * * *